Patented Aug. 14, 1945

2,382,239

UNITED STATES PATENT OFFICE 2,382,239

CONVERSION OF HYDROCARBON OIL

Edward C. Lee, Chicago, Ill., assignor to Universal Oil Products Company, Chicago, Ill., a corporation of Delaware No Drawing. Application September 30, 1938, Serial No. 232,567

19 Claims. (Cl. 196—52)

This invention relates particularly to the conversion of hydrocarbon fractions produced in distilling petroleum oils and especially those of a distillate character which are vaporizable without substantial decomposition.

In a more specific sense the invention is concerned with a modification of hydrocarbon oil conversion processes involving the use of particular and specific types of catalysts which function to selectively promote the formation of low boiling gasoline fractions, and readily polymerizable normally gaseous olefins.

The art of cracking relatively heavy hydrocarbons to produce primarily gasoline or gas is very extensive and it is recognized that most of the basic principles of hydrocarbon decomposition by thermal treatment are known and that particular commercial processes have been developed which embody these principles. The application of catalysts, however, in cracking reactions is practically upon the same basis as it is in other fields, that is, the knowledge of what catalysts to employ when it is desired to crack different fractions from different petroleums is largely empirical and admits of no generalizations. A large number of catalysts have a tendency to accelerate reactions leading to the formation of gas rather than of gasoline, this being particularly evidenced by reduced metal catalysts such as nickel or iron, and many of such catalysts are sensitive to sulfur poisoning and are quickly coated with carbonaceous materials which render them practically inert. This deposition of carbonaceous materials is many times related to the type of decomposition reactions selectively fostered by the catalyst and in general it may be said that very few if any catalysts which have been tried thus far in cracking reactions have reached a commercial status.

The present invention is concerned with the use of catalytic materials which are specially adapted to accelerate the cracking of heavy fractions of petroleum and other hydrocarbonaceous materials to increase the rate of production of gasoline-boiling range fractions. The preferred catalysts are characterized by selectivity in accelerating gasoline-forming reactions rather than the gas-forming reactions, by their refractory character which enables them to retain their catalytic properties under severe conditions of temperature and pressure and by their ease and simplicity of manufacture and their exact reproducibility.

In one specific embodiment the present invention comprises subjecting hydrocarbon oil vapors at elevated temperatures and substantially atmospheric pressure to contact with catalysts comprising specially prepared silica activated by the deposition thereon of zirconia ($ZrO_2$), these catalysts being specially adapted to produce relatively high yields of good antiknock gasoline and gases containing relatively high percentages of readily polymerizable olefins.

According to the present invention the heavier distillate fractions of petroleum are cracked at temperatures within the ordinary non-catalytic cracking range, say 800 to 1200° F. but at substantially only atmospheric pressure while in contact with catalysts produced by depositing hydrated zirconia upon a relatively pure salt-free silica gel, followed by washing to remove soluble salts and drying to remove the major portion of combined or adsorbed water. In the catalysts thus prepared the molal ratio of silica to zirconia is usually greater than 10:1, active catalysts having been prepared in which the ratio is as high as 50:1 so that in effect the zirconia acts as a promoter of the catalytic activity of the silica in the conversion reactions.

The use of the smallest amount of zirconia that will give the observed effect is preferred although catalysts containing 25 to 50% zirconia are effective and are considered within the scope of this invention.

It is to be recognized that very little is known positively concerning the mechanism of promoter action in catalysts and no attempt will be made herein to offer any definite reasons for the observed effect of the addition of small amounts of zirconia to silica. There may be a joint promoter effect or it may be that the zirconia is the more active catalyst and is extensively dispersed in and on the silica in order to present a large surface.

In manufacturing catalysts for the present process it is preferable to employ silica which has been prepared by precipitation from solution as a gel as a primary base or carrier for the support of the zirconia. The most convenient and ordinary method of preparation of such a gel is to acidify an aqueous solution of sodium silicate by the addition of the required amount of acid. The excess acid and the concentration of the solution in which the precipitation is brought about will determine the primary activity of the silica and its suitability for acting as a support for zirconia to produce a composite catalyst of high catalytic activity. In general the most active silica is produced by only slightly acidifying the sodium silicate, but the material formed at such a point is rather gelatinous and is filtered with difficulty. By using a moderate excess of acid, the more desirable physical characteristics in regard to catalytic activity are conserved while the "filtrability" is greatly improved. Fairly good hydrated silica for present catalytic purposes may be made by employing as high as a 20% excess of acid.

After precipitating the silica, it is preferably washed until substantially free from salts and acid. It is most important that substantially all traces of alkali metal compounds be removed from the washed silica. This may be done, for example, by further washing with hydrochloric acid, ammonium chloride, or zirconium chloride solutions. The exact effect of washing with these solutions is not known but treatment with these solutions is definitely more effective in removing the alkali metal compounds than simple water washing treatment. It appears that the hydrogen, ammonium, zirconium, and chloride ions exert a displacing action bringing about the removal of the alkali metal ions. Subsequently, the soluble salts are substantially removed by water washing treatment. Experience has indicated, however, that the complete removal of acid and/or the ammonium salts introduced as a result of the above washing treatment is not particularly important inasmuch as these materials will be later volatilized in the drying and calcining treatment. Minor amounts of zirconium compounds resulting from the washing treatment are also not detrimetal since these compounds are a desirable component of the catalyst.

In one mode of preparing the preferred catalysts, the necessary silicic acid gel is either stirred with a separately precipitated zirconium hydroxide, which is added in the wet condition to the silica suspension, or stirred with a zirconium salt solution, such as, for example, an aqueous solution of zirconyl chloride ($ZrOCl_2$) or a somewhat acid aqueous solution of zirconium sulfate. In either case the final precipitate comprising the hydrated silica and hydrated zirconia is finally washed to substantially complete removal of water soluble materials and dried at about 300° F. to produce a rather hard and semi-translucent material which may be ground and sized to produce particles of catalyst. Since this material is used at temperatures of the order of 800–1200° F. its water content is further reduced until after a brief period of service it amounts to but 2–3% by weight of the catalyst particles.

The necessary hydrated zirconia may be obtained by adding alkaline precipitants such as ammonium hydroxide, ammonium carbonate, ammonium sulfide or an organic base to aqueous solutions of zirconium salts followed by suitable washing to remove impurities before the hydrated zirconia mass is added to the silica, either mechanically in the wet condition or in suspension in water. The hydrated zirconia also may be precipitated from a solution of one of its salts, in which previously prepared and washed hydrated silica is suspended, followed by a washing of the total composite precipitate. Other alternative but generally practical methods for forming a precipitate of zirconium tetra-hydroxide involve the interaction of zirconium tetra-chloride and sulfur dioxide in a slightly acid solution, the interaction of zirconium sulfate and alkali metal cyanides, and the interaction of zirconium sulfate and sodium acetate or sodium hydroxide.

Describing in more detail the preparation of the composite catalytic material, this may be accomplished by separately precipitating silica gel by acidifying an aqueous solution of an alkali metal silicate, and filtering and washing said silica gel with hydrochloric acid and water to remove substantially all soluble substances, suspending the washed silica in water, adding thereto zirconia produced by adding an alkaline precipitant selected from the group consisting of ammonium hydroxide, ammonium carbonate, and ammonium sulfide or organic bases to an aqueous solution of zirconium salt, filtering and washing the suspended material to remove soluble substances, heating the washed material to remove a major portion of its total water content, producing particles of definite size, and further heating at a temperature above 900° F. to reduce the total water content to below 5%.

As a modification of the above-described method, the separately precipitated silica gel, prepared by acidification of an alkali metal silicate solution and freed of soluble substances by washing with hydrochloric acid or ammonium chloride solution and then with water, may be suspended in a zirconium salt solution and zirconia precipitated on the silica by heating the suspension or by adding thereto an alkaline precipitant such as ammonium hydroxide. The mixed precipitate is then filtered and washed, heated to remove the major portion of its water content, formed into particles of definite size and further heated to above 900° F. to reduce the water content to below 5%.

Although the separate preparation of silica gel and zirconia have been described in detail, the scope of the invention should not be considered as restricted in this particular step of the procedure since the preferred catalyst may also be prepared by the interaction of solutions of soluble alkali metal silicates with solutions of zirconium salts including soluble zirconates to simultaneously precipitate hydrated silica and hydrated zirconia. For example, a co-precipitated silica-zirconia catalyst may be produced by adding to an aqueous solution of an alkali metal silicate an aqueous solution containing a sufficient quantity of hydrochloric acid and zirconium salt to precipitate a silica gel by the acidification of said alkali metal silicate, filtering the composite precipitate comprising hydrated silica and hydrated zirconia, washing to remove alkali metal ions, heating the washed material to remove a major portion of its total water content, producing particles of a definite size, and heating at a temperature above 900° F. to reduce the total water content to less than 5% by weight.

Catalysts prepared for the process by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that catalysts may be reactivated and reused for long periods of time.

According to the present process, catalysts prepared by the general procedure described in the preceding paragraphs may be utilized as filling material in tubes or chambers in the form of pellets or granules. In the majority of cases wherein hydrocarbon fractions readily vaporizable at moderate temperatures without extensive decomposition are employed, the average particle size is within the range of 1–10 mesh, which may apply either to small pellets of uniform size and short cylindrical shape or to particles of irregular size and shape produced by the grinding and sizing of the partially dehydrated materials. The simple method of preheating a given fraction of hydrocarbon oil vapors to a temperature suitable for their cracking in contact with the catalysts and then passing the vapors over a stationary mass of catalyst particles contained in a chamber (preferably vertical) may be employed or it may be preferable to pass the preheated vapors through banks of relatively small diameter catalyst-containing tubes in multiple connection between headers, since this arrangement of apparatus is better adapted to permit exterior heating of the catalyst tubes to compensate for the heat loss in the endothermic cracking reactions.

After the passage of the oil vapors over the catalyst, the products may be separated into heavy residual materials unsuitable for further cracking on account of their coke-forming tendencies, intermediate insufficiently converted fractions amenable to further catalytic cracking, gasoline boiling range materials and fixed gases, the intermediate fractions being returned directly to admixture with the charging stock so that ultimately there is complete recycling of all desirable uncracked fractions and maximum utilization of the charging stock for gasoline production.

The present process besides being characterized by the use of novel catalysts is further characterized by the use of moderate temperatures, relatively low pressures and high throughputs in comparison with strictly thermal cracking processes in use at the present time. When dealing with intermediate distillate fractions of the character of gas oil, temperatures not greatly in excess of 900° F. are usually used in the catalytic conversion zone approximately 1200° F. being, however, the upper limit temperature which is employed in practice. In the matter of pressures, it is seldom desirable to employ those materially above atmospheric except in so far as this is necessary to insure a proper flow through the vaporizing and cracking zones and the succeeding fractionating equipment. However, since the pressure increases the capacity of both cracking and fractionating units, moderately super-atmospheric pressures may be employed when their use is dictated by the overall economy of the process. The times of catalytic contact are relatively short and usually of the order of 10 seconds or less.

The following example of the preparation and use of catalysts peculiar to the present invention is given to indicate the novelty and utility of the present process in comparison with ordinary high-pressure cracking processes although not for the purpose of limiting the invention in exact agreement with the data introduced.

A catalyst was prepared which consisted approximately of 92 silica ($SiO_2$) and 8% zirconia ($ZrO_2$) calculated on a dry basis. 1356 parts by weight of precipitated and purified silica gel containing 86.7% water by weight and hence 180 parts by weight anhydrous silica was suspended in water and an amount of a solution of zirconyl chloride ($ZrOCl_2$) containing altogether 14.8 parts by weight of equivalent $ZrO_2$ was added and thoroughly mixed with the slurry of suspended silica. An excess of ammonium hydroxide was then gradually added to precipitate the tetra hydroxide of zirconium ($Zr(OH)_4$) which was uniformly deposited on the wet silica. The precipitate was filtered and carefully washed free of adsorbed salts and heated at a temperature of about 300° F. to produce a rather hard and readily pulverizable material which was ground and sized to produce particles of approximately 6–10 mesh.

The catalyst as prepared was placed in a catalytic reaction chamber, a Pennsylvania gas oil was vaporized at a pressure slightly above atmospheric and the vapors were heated to a temperature of about 930° F. and passed through the catalyst granules. In a once-through operation there was produced a 24% yield of 78 octane number gasoline which was separated by fractionation, the unconverted materials of high boiling range being recycled to produce an ultimate yield of approximately 60%. There was produced in addition 10% by weight of the charge of readily polymerizable olefins so that the ultimate recycle yield of gasoline was increased to about 70%.

I claim as my invention:

1. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material comprising essentially a calcined composite of a precipitated silica gel which has been substantially completely freed of alkali metal compounds and upon which hydrated zirconia has been deposited.

2. A process for converting hydrocarbon distillates containing substantially no gasoline into substantial yields of gasoline and readily polymerizable normally gaseous olefinic hydrocarbons, which comprises subjecting said distillate at a temperature of the order of 800–1200 F. and substantially atmospheric pressure to contact with catalytic material produced by separately precipitating silica gel by acidifying an aqueous solution of an alkali metal silicate and washing said gel to remove substantially all impurities, adding thereto zirconia produced by adding an alkaline precipitant to an aqueous solution of zirconium salt and purified by washing to remove soluble salts, and heating and calcining the composite to remove a major portion of combined water.

3. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by separately precipitating silica gel by separately acidifying an aqueous solution of an alkali metal silicate and filtering and washing said silica gel with hydrochloric acid and water to remove substantially all soluble substances, suspending the washed silica in water, adding thereto zirconia produced by adding an alkaline precipitant to an aqueous solution of zirconium salt, heating the suspension of silica and zirconia, filtering and washing the suspended material to remove soluble substances, heating the washed material to remove a major portion of its water content, producing particles of a definite size, and further heating at a temperature above 900° F. to reduce the total water content to below 5%.

4. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by separately precipitating silica gel by acidifying an aqueous solution of an alkali metal silicate, and filtering and washing with hydrochloric acid and water to remove substantially all soluble substances, suspending said washed silica in a solution of a zirconium salt, precipitating zirconia from the solution onto the suspension to effect the addition of zirconia to silica, filtering and washing the suspended material to remove soluble substances, heating to remove a major portion of the total water content, producing particles of definite sizes, and further heating at a temperature above 900° F., to reduce the total water content to below 5%.

5. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by separately precipitating silica gel by acidifying an aqueous solution of an alkali metal silicate, filtering and washing said silica gel with ammonium chloride solution and further washing with water, suspending said washed silica gel in a solution of a zirconium salt, precipitating zirconia from the solution onto the suspension to effect the addition of zirconia to silica, filtering and washing the suspended material to remove soluble substances, heating to remove a major portion of the total water content, producing particles of a definite size, and further heating at a temperature above 900° F. to reduce their total water content to below 5%.

6. A process for converting hydrocarbon distillates containing substantially no gasoline into substantial yields of gasoline and readily polymerizable gaseous olefinic hydrocarbons, which comprises subjecting said distillate at a temperature of the order of 800–1200° F. and substantially atmospheric pressure to contact with catalytic material produced by separately precipitating silica gel by acidifying an aqueous solution of an alkali metal silicate, and filtering and washing said silica gel with hydrochloric acid and water to remove substantially all soluble substances, suspending the washed silica in water, adding thereto zirconia produced by adding an alkaline precipitant selected from the group consisting of ammonium hydroxide, ammonium carbonate, and ammonium sulfide or organic bases to an aqueous solution of zirconium salt, filtering and washing the suspended material to remove soluble substances, heating the washed material to remove a major portion of its total water content, producing particles of definite size, and further heating at a temperature above 900° F. to reduce the total water content to below 5%.

7. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by adding to an aqueous solution of an alkali metal silicate an aqueous solution containing a sufficient quantity of hydrochloric acid and zirconium salt to precipitate a silica gel by the acidification of said alkali metal silicate, filtering the composite precipitate comprising hydrated silica and hydrated zirconia, washing to remove alkali metal ions, heating the washed material to remove a major portion of its total water content, producing particles of a definite size, and heating at a temperature above 900° F. to reduce the total water content to less than 5% by weight.

8. A process for the production of gasoline from hydrocarbon oils heavier than gasoline which comprises cracking the oil in the presence of a calcined composite of a precipitated silica gel which has been substantially completely freed of alkali metal compounds and upon which hydrated zirconia has been deposited.

9. The process as defined in claim 8 further characterized in that the hydrated zirconia is deposited on the silica gel by precipitating it from a zirconium salt solution in which the silica gel has been suspended.

10. The process as defined in claim 8 further characterized in that the hydrated zirconia is precipitated independently of the silica gel and then commingled with the latter.

11. The process as defined in claim 8 further characterized in that said silica gel and hydrated zirconia are co-precipitated.

12. A process for the production of gasoline from hydrocarbon oils heavier than gasoline which comprises cracking the oil in the presence of a calcined composite of a precipitated silica gel containing deposited hydrated zirconia.

13. A process for the production of gasoline from hydrocarbon oils heavier than gasoline which comprises cracking the oil in the presence of a contact mass comprising silica and zirconia prepared by interaction in aqueous menstruum of a soluble silicate and a zirconium salt.

14. A process for cracking hydrocarbon oils which comprises passing the oil to be cracked while at cracking temperature through a cracking zone containing a catalyst comprising silica and zirconia prepared by acidifying an alkali metal silicate solution to form hydrated silica, removing reaction impurities from the hydrated silica so formed and thereafter incorporating the zirconia into said silica, and maintaining said oil in contact with said catalyst within said cracking zone for a period sufficient to obtain substantial cracking thereof.

15. A process for cracking hydrocarbon oils which comprises subjecting the oil under cracking conditions to the action of a catalyst comprising silica and zirconia prepared by acidifying an alkali metal silicate solution to form hydrated silica, removing alkali metal compounds from the hydrated silica so formed and thereafter incorporating a minor proportion of zirconia into said silica.

16. A process for the production of gasoline from hydrocarbon oils heavier than gasoline which comprises cracking the oil in the presence of a catalyst comprising silica and zirconia prepared by compositing zirconia with silica resulting from acidification of an alkali metal silicate solution.

17. A process for the production of gasoline from hydrocarbon oils heavier than gasoline which comprises cracking the oil in the presence of a catalyst comprising a calcined composite of a precipitated silica gel and precipitated hydrated zirconia.

18. A process for cracking hydrocarbon oils which comprises subjecting the oil under cracking conditions to the action of a catalyst comprising a composite of a minor proportion of zirconia and a major proportion of a precipitated silica gel.

19. A process for the production of gasoline from hydrocarbon oils heavier than gasoline which comprises cracking the oil in the presence of a catalyst comprising a calcined composite of precipitated hydrated silica and precipitated hydrated zirconia, said silica and zirconia having been coprecipitated.

EDWARD C. LEE.